United States Patent
Lee et al.

(10) Patent No.: US 8,750,402 B2
(45) Date of Patent: Jun. 10, 2014

(54) METHOD FOR TRANSMITTING REFERENCE SIGNAL IN DOWNLINK MULTI-INPUT MULTI-OUTPUT SYSTEM

(75) Inventors: Moon Il Lee, Anyang-si (KR); Wook Bong Lee, Anyang-si (KR); Jae Hoon Chung, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 13/145,557

(22) PCT Filed: Jan. 29, 2010

(86) PCT No.: PCT/KR2010/000542
§ 371 (c)(1),
(2), (4) Date: Jul. 20, 2011

(87) PCT Pub. No.: WO2010/087639
PCT Pub. Date: Aug. 5, 2010

(65) Prior Publication Data
US 2011/0274205 A1 Nov. 10, 2011

Related U.S. Application Data

(60) Provisional application No. 61/148,405, filed on Jan. 30, 2009.

(30) Foreign Application Priority Data

Sep. 22, 2009 (KR) .................. 10-2009-0089530

(51) Int. Cl.
*H04B 7/02* (2006.01)
*H04L 1/02* (2006.01)

(52) U.S. Cl.
USPC ............................ 375/267; 455/132; 455/504

(58) Field of Classification Search
None
See application file for complete search history.

(56) References Cited

U.S. PATENT DOCUMENTS 8,228,862 B2 * 7/2012 Nam et al. ............... 370/329
8,315,225 B2 * 11/2012 Xu et al. .................. 370/330

(Continued)

FOREIGN PATENT DOCUMENTS

KR 1020070121589 12/2007

OTHER PUBLICATIONS

Taoka, et al., "Optimum Reference Signal Structure for MIMO Multiplexing Using Precoding in Evolved UTRA Downlink", Military Communications Conference, MILCOCOM 2007, pp. 1-6.

*Primary Examiner* — Shuwang Liu
*Assistant Examiner* — Gina McKie
(74) *Attorney, Agent, or Firm* — Lee, Hong, Degerman, Kang & Waimey

(57) ABSTRACT

Provided is a method for transmitting a reference signal (RS) in a downlink multi-input multi-output (MIMO) system which supports a first user equipment (UE) for supporting N transmission antennas from among a total of M transmitting antennas and a second UE for supporting M transmitting antennas (wherein, M>N). The method comprises the steps of: generating a subframe for simultaneously supporting the first UE and the second UE at a base station; transmitting the subframe; and mapping a common reference signal (CRS) for antenna port 0 to antenna port N−1, mapping a CRS for antenna port N to antenna port M−1, and controlling a power level of a CRS for antenna port 0 to antenna port N−1 and a power level of CRS for antenna port N to antenna port M−1, independently from one another, at the subframe.

15 Claims, 12 Drawing Sheets

(56) References Cited

U.S. PATENT DOCUMENTS

| | | |
|---|---|---|
| 2008/0260062 A1 | 10/2008 | Imamura |
| 2012/0201164 A1* | 8/2012 | J ngren et al. .................. 370/252 |
| 2013/0003663 A1* | 1/2013 | Blankenship et al. ......... 370/329 |
| 2013/0194940 A1* | 8/2013 | Li et al. .......................... 370/252 |

* cited by examiner

Antenna port 5

FIG. 10
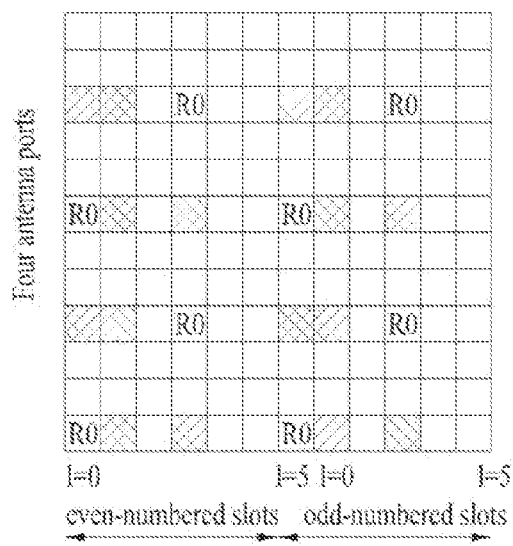
Antenna port 0
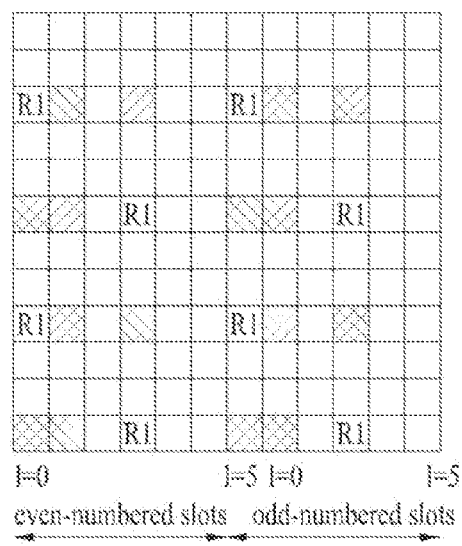
Antenna port 1
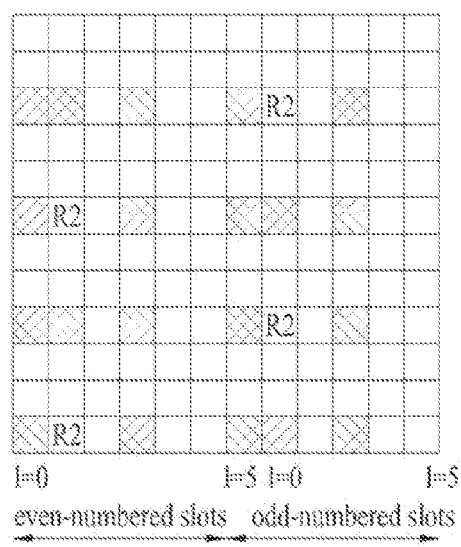
Antenna port 2
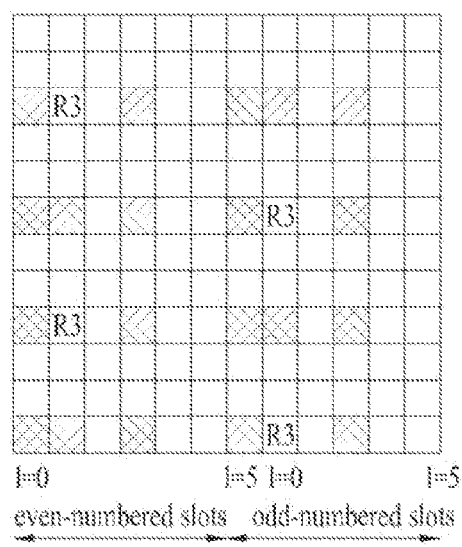
Antenna port 3

METHOD FOR TRANSMITTING REFERENCE SIGNAL IN DOWNLINK MULTI-INPUT MULTI-OUTPUT SYSTEM

CROSS-REFERENCE TO RELATED APPLICATIONS

This application is the National Stage filing under 35 U.S.C. 371 of International Application No. PCT/KR2010/000542, filed on Jan. 29, 2010, which claims the benefit of earlier filing date and right of priority to Korean Application No. 10-2009-0089530, filed on Sep. 22, 2009, and also claims the benefit of U.S. Provisional Application Ser. No. 61/148,405, filed on Jan. 30, 2009, the contents of which are all incorporated by reference herein in their entirety.

FIELD OF THE INVENTION

The present invention relates to a method for efficiently providing a pilot symbol in an environment where an antenna is added to a conventional system, in a multiple-input multiple-output (MIMO) communication system.

BACKGROUND ART

LTE Physical Structure

A 3GPP ($3^{rd}$ Generation Project Partnership) LTE (Long Term Evolution) supports a type 1 Radio Frame Structure that is applicable to an FDD (Frequency Division Duplex) and a type 2 Radio Frame Structure that is applicable to a TDD (Time Division Duplex).

FIG. 1 illustrates the structure of a type 1 radio frame. The type 1 radio frame consists of 10 subframes, and each subframe consists of 2 Slots.

FIG. 2 illustrates the structure of a type 2 radio frame. The type 2 radio frame consists of 2 half frames, and each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation performed by a user equipment. The UpPTS is used for channel estimation performed by a base station and for uplink transmission synchronization performed by the user equipment. The guard period corresponds to a period for eliminating interference occurring in an uplink due to a multiple path delay of a downlink signal between an uplink and a downlink. More specifically, regardless of the type of the radio frame, one frame is configured of 2 slots.

FIG. 3 illustrates a slot structure of an LTE downlink. As shown in FIG. 3, a signal being transmitted from each slot may be expressed by a Resource Grid, which consists of $N_{RB}^{DL}$ $N_{sc}^{BR}$ number of subcarriers and $N_{symb}^{DL}$ number of OFDM (Orthogonal Frequency Division Multiplexing) symbols. Herein, $N_{RB}^{DL}$ represents a number of Resource Blocks (RBs) within a downlink, $N_{sc}^{RB}$ represents a number of subcarriers configuring one RB, and $N_{symb}^{DL}$ represents a number of OFDM symbols included in a downlink slot.

FIG. 4 illustrates a slot structure of an LTE uplink. As shown in FIG. 8, a signal being transmitted from each slot may be expressed by a Resource Grid, which consists of $N_{RB}^{UL}$ $N_{sc}^{RB}$ number of subcarriers and $N_{symb}^{UL}$ number of OFDM (Orthogonal Frequency Division Multiplexing) symbols. Herein, $N_{RB}^{UL}$ represents a number of Resource Blocks (RBs) within an uplink, $N_{sc}^{RB}$ represents a number of subcarriers configuring one RB, and $N_{symb}^{UL}$ represents a number of OFDM symbols included in an uplink slot.

A Resource Element is a resource unit that is defined by indexes (a, b) within the downlink slot and the uplink slot. Herein, a indicates an index within a frequency axis, and b represents an index within a time axis.

FIG. 5 illustrates the structure of a downlink subframe. Referring to FIG. 5, in a subframe, a maximum of 3 OFDM symbols located at the beginning of a first slot correspond to a control region allocated to a control channel. The remaining OFDM symbols correspond to a data region allocated to a Physical Downlink Shared Channel (PDSCH). Examples of a downlink control channel used by a 3GPP LTE may include a PCFICH (Physical Control Format Indicator Channel), a PDCCH (Physical Downlink Control Channel), a PHICH (Physical Hybrid ARQ Indicator Channel), and so on.

Method of Allocating User Equipment Specific Reference Signals in a 3GPP LTE Downlink System Among the above-described radio (or wireless) frame structure supported by the 3GPP LTE, the structure of a radio frame applicable to FDD will now be described in detail. Herein, one frame is configured of 10 subframes that are aligned along a section of 1 msec. One subframe is transmitted during a time period 1 msec. One subframe is configured of 14 or 12 OFDM (Orthogonal Frequency Division Multiplexing) symbols, and, within an OFDM symbol, any one of 128, 256, 512, 1024, 1536, and 2048 may be selected and used as the number of subcarriers.

FIG. 6 illustrates a user specific downlink reference signal structure with respect to a subframe using a normal Cyclic Prefix (normal CP), wherein 1TTI (Transmission Time Interval) has 14 OFDM symbols. Referring to FIG. 6, R5 represents a user specific reference signal (RS), and ✐ indicates an OFDM symbol position within a respective subframe.

FIG. 7 illustrates a user specific downlink reference signal structure, with respect to a subframe using an extended Cyclic Prefix (extended CP), wherein 1TTI (Transmission Time Interval) has 12 OFDM symbols.

FIG. 8 to FIG. 10 respective illustrate a downlink reference signal structure common to all user equipments for a system having 1, 2, and 4 transmitting antennas, when 1TTI has 14 OFDM symbols. Referring to FIG. 8 to FIG. 10, R0 represents a pilot symbol for transmitting antenna 0, R1 represents a pilot symbol for transmitting antenna 1, R2 represents a pilot symbol for transmitting antenna 2, and R3 represents a pilot symbol for transmitting antenna 3. In order to eliminate interference with all of the other transmitting antennas, a signal is not transmitted on the subcarrier carrying a pilot symbol of a transmitting antenna with the exception for the transmitting antenna transmitting the pilot symbol.

FIG. 6 and FIG. 7 correspond to user specific downlink reference signal structures, which can be simultaneously used with the user common downlink reference signals of FIG. 8 to FIG. 10. For example, the user common downlink reference signals of FIG. 8 to FIG. 10 are used in OFDM symbols #0, #1, and #2 of the first slot in which control information is transmitted, and the user specific downlink reference signals are used in the remaining OFDM symbols. Also, by multiplying a pre-defined sequence (e.g., Pseudo-random (PN), m-sequence, etc.) by a downlink reference signal for each cell, interference caused by a signal of the pilot symbol received by the receiver from a neighboring cell may be decreased, thereby enhancing the channel estimation performance. A PN sequence may be applied in OFDM symbol units within a subframe, and the application of the PN sequence may vary depending upon a cell ID, a subframe number, an OFDM symbol position, and user equipment ID.

Hereinafter, the LTE-A system should be configured to provide 8Tx reference signals, in order to support an 8Tx MIMO (Multiple Input Multiple Output) scheme in an LTE-A (LTE-Advanced) system, and should also be configured to be recognized as a 4Tx or 2Tx system by LTE User Equipment (UEs), in order to support both the LTE UEs and LTE-A UEs. In order to do so, an RS configuration method and a system configuration method for supporting an 8Tx MIMO scheme, which can maintain a 4Tx RS structure of the conventional LTE system as much as possible, are required.

DETAILS OF THE INVENTION

Objects for Resolving the Problems

The technical object which the present invention seeks to achieve is to provide an RS configuration method and a system configuration method for supporting an 8Tx MIMO scheme, while maintaining a 4Tx RS structure of the conventional LTE system at the most.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

DETAILED DESCRIPTION OF THE INVENTION

Technical Objects

The technical object which the present invention seeks to achieve is to provide an RS configuration method and a system configuration method for supporting an 8Tx MIMO scheme, while maintaining a 4Tx RS structure of the conventional LTE system at the most.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical objects of the present invention, according to an aspect of the present invention, in a downlink MIMO (Multi Input Multi Output) system that supports a first UE (User Equipment) supporting N number of transmitting antennas among a total of M number of transmitting antennas and a second UE supporting M (wherein M>N) number of transmitting antennas, a reference signal transmission method comprises: creating, by a base station, a subframe supporting both the first UE and the second UE; and transmitting the subframe, wherein, in the subframe, Common Reference Signals (CRSs) for antenna ports 0 to N−1 are mapped, and CRSs for antenna ports N to M−1 are mapped, and wherein a power level of the CRSs for antenna ports 0 to N−1 and a power level of the CRSs for antenna ports N to M−1 are independently controlled.

The power level of the CRSs for antenna ports 0 to N−1 may be greater than the power level of the CRSs for antenna ports N to M−1.

The power level of the CRSs for antenna ports 0 to N−1 may be controlled within a predetermined range, and the power level of the CRSs for antenna ports N to M−1 may be determined as a fixed power level.

The power level of the CRSs for antenna ports 0 to N−1 and the power level of the CRSs for antenna ports N to M−1 may have a difference of a predetermined value.

N may be equal to 4, and M may be equal to 8.

According to another aspect of the present invention, in a downlink MIMO (Multi Input Multi Output) system that supports a first UE (User Equipment) supporting N number of transmitting antennas among a total of M number of transmitting antennas and a second UE supporting M (wherein M>N) number of transmitting antennas, a reference signal transmission method comprises: creating, by a base station, a subframe supporting both the first UE and the second UE; and transmitting the subframe, wherein, in the subframe, Common Reference Signals (CRSs) for antenna ports 0 to N−1 are mapped, and CRSs for antenna ports N to M−1 are mapped, and wherein, if a spatial multiplexing rate of the second UE is greater than N, Dedicated Reference Signal(s) (DRS(s)) for a number of antennas corresponding to a difference value between the spatial multiplexing rate and the value N are mapped.

N may be equal to 4, and M may be equal to 8.

According to yet another aspect of the present invention, in a downlink MIMO (Multi Input Multi Output) system that supports a first UE (User Equipment) supporting N number of transmitting antennas among a total of M number of transmitting antennas and a second UE supporting M (wherein M>N) number of transmitting antennas, a reference signal transmission method comprises: creating, by a base station, a subframe supporting both the first UE and the second UE; and transmitting the subframe, wherein, in the subframe, Common Reference Signals (CRSs) for antenna ports 0 to N−1 are mapped, and CRSs for antenna ports N to M−1 are mapped, and wherein a Dedicated Reference Signal (DRS) is mapped based on a pattern selected from multiple DRS patterns, which are created in advance for each spatial multiplexing rate of the second UE.

The multiple DRS patterns may be created in accordance with a transmission mode per spatial multiplexing rate of the second UE.

The multiple DRS patterns may be created patterns in accordance with an RS overhead per spatial multiplexing rate of the second UE.

N may be equal to 4, and M may be equal to 8.

Effects of the Invention

According to the present invention, by supporting a 4Tx MIMO scheme and an 8Tx MIMO scheme at the same time, complexity in the system design may be minimized and RS overhead may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

FIG. 8 to FIG. 10 respective illustrate a downlink reference signal structure common to all user equipments for a system having 1, 2, and 4 transmitting antennas, when 1TTI has 14 OFDM symbols.

BEST MODE FOR CARRYING OUT THE PRESENT INVENTION

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, although the following description is given based upon specific terms, the description of the present invention is not required to be limited only to such terms, and the same meaning may also be indicated by other arbitrary terms. Furthermore, the same reference numbers may be used for the same or similar elements throughout the entire description of the present invention.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", "module", and so on, which are indicated in the description of the present invention, indicates units that process at least one function or operation. And, this may be realized in the form of hardware or software, or a combination of hardware and software.

In the following description, an LTE user equipment (e.g., 3GPP Rel-8) refers to a user equipment supported by an LTE system, and an LTE-A system refers not to a legacy user equipment but to a user equipment supported by an LTE-A system.

Before describing the present invention, the structure of a radio frame (or wireless frame) in a 3GPP LTE system will be described.

Figure 1:
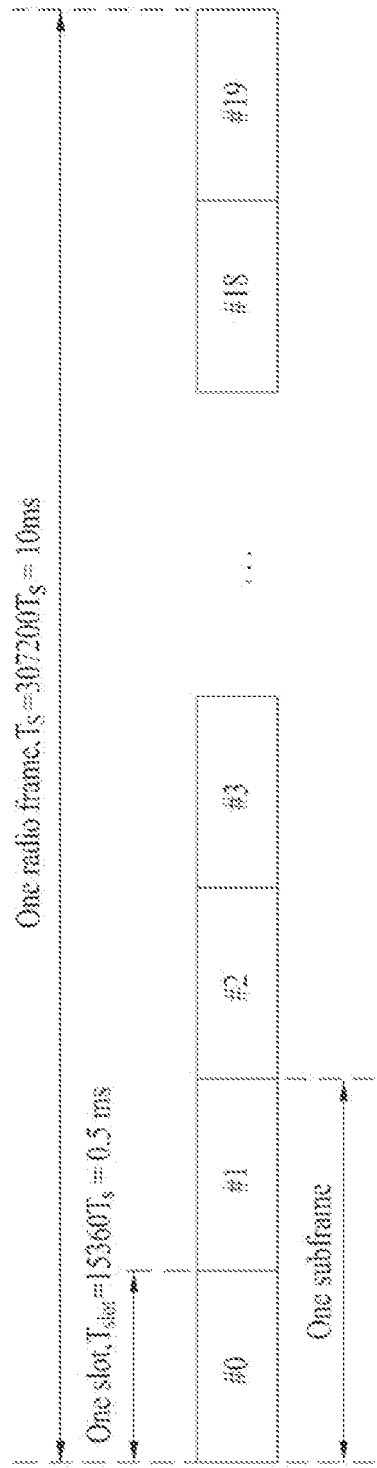
FIG. 1 illustrates the structure of a type 1 radio frame.
Figure 2:
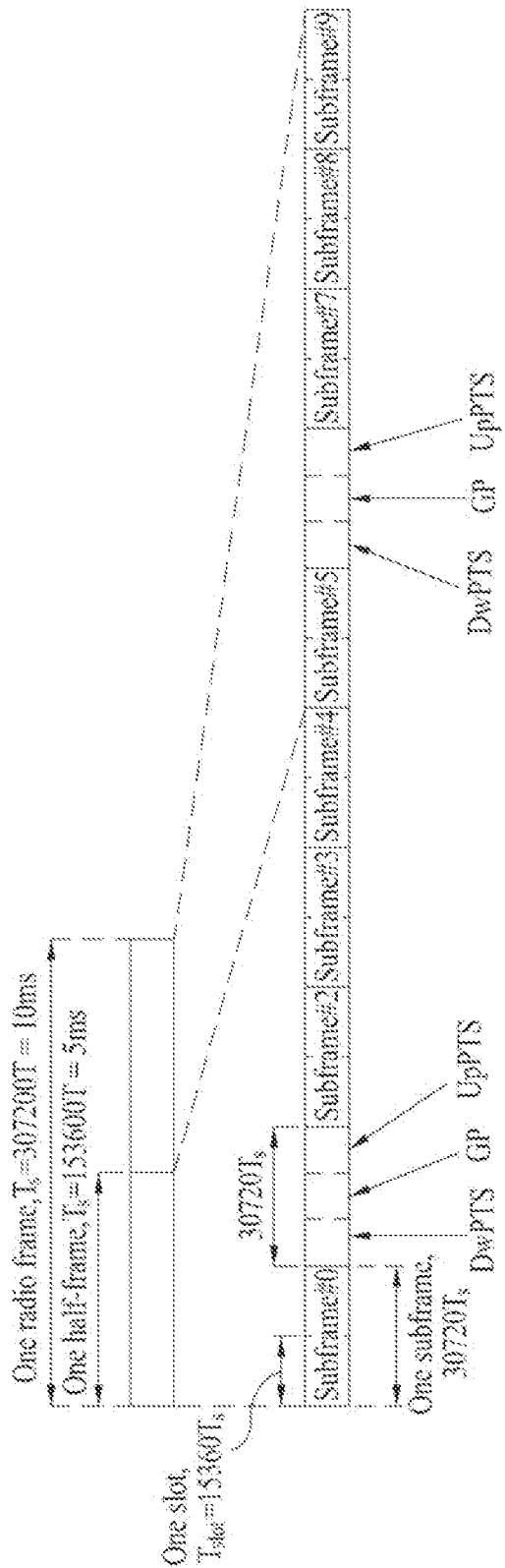
FIG. 2 illustrates the structure of a type 2 radio frame.
Figure 3:
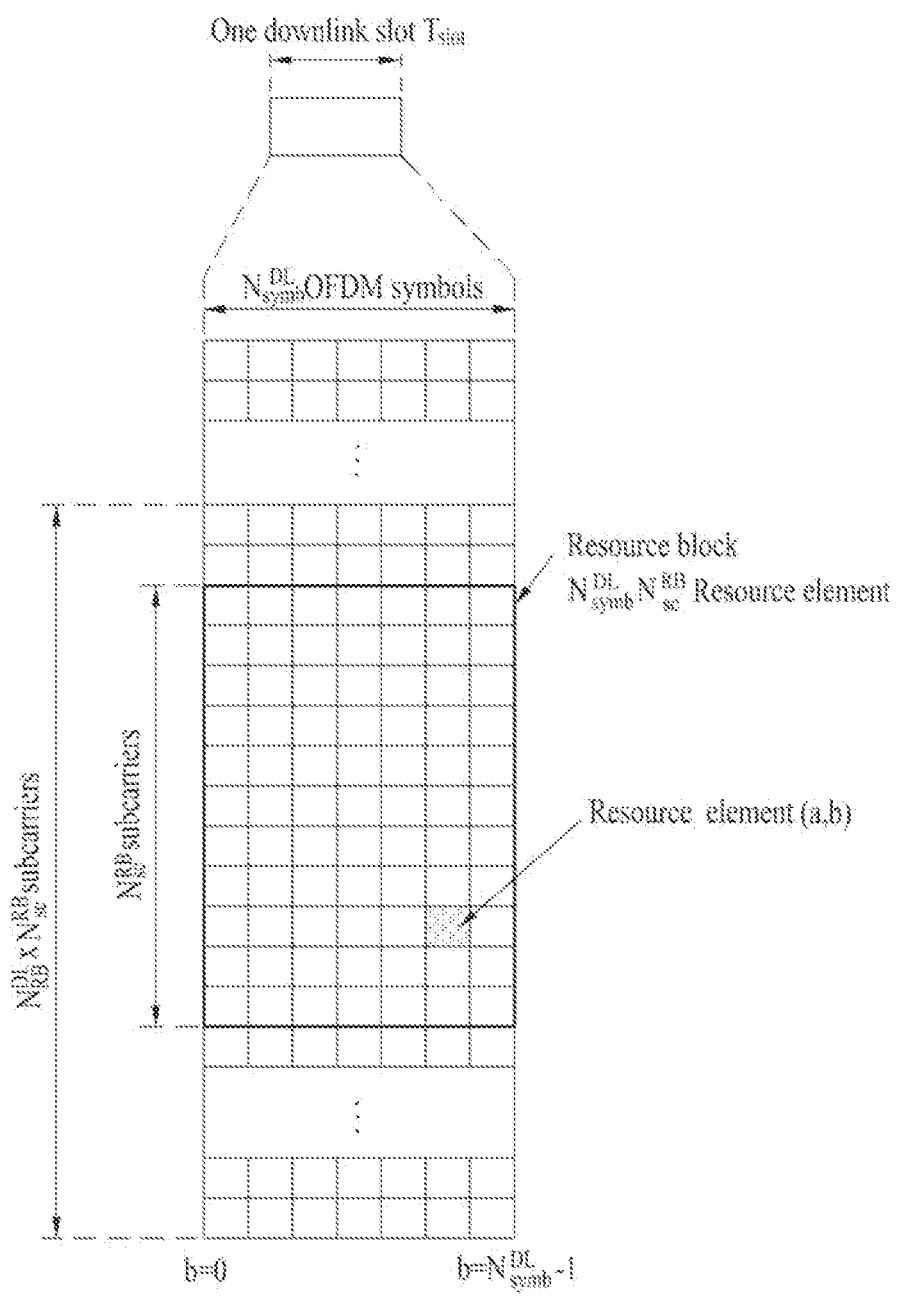
FIG. 3 illustrates a slot structure of an LTE downlink.
Figure 4:
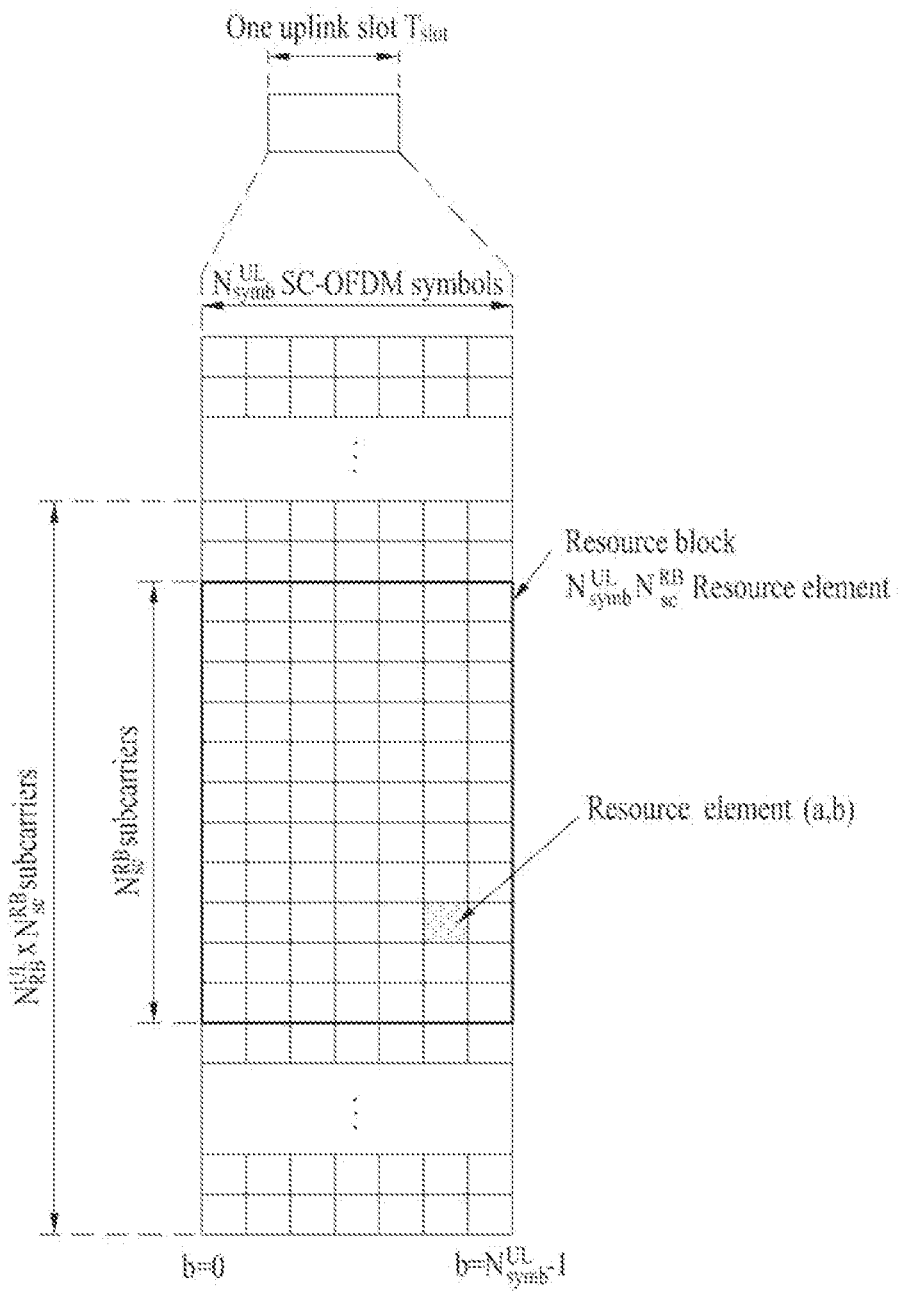
FIG. 4 illustrates a slot structure of an LTE uplink.
Figure 5:
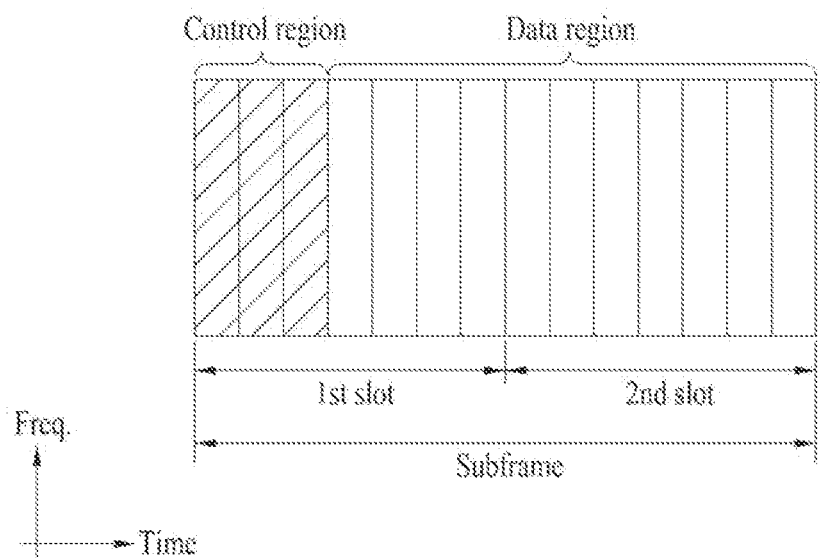
FIG. 5 illustrates the structure of a downlink subframe.
Figure 6:
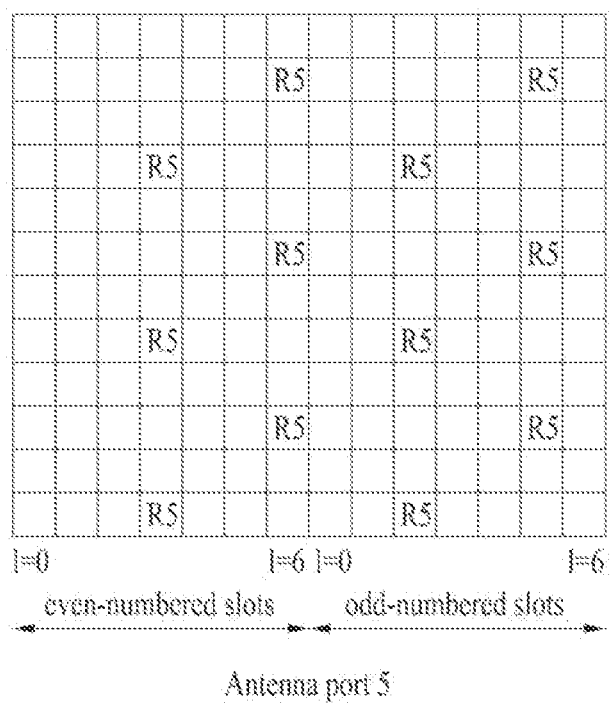
FIG. 6 illustrates a user specific downlink reference signal structure with respect to a subframe using a normal Cyclic Prefix (normal CP), wherein 1TTI (Transmission Time Interval) has 14 OFDM symbols.
Figure 7:
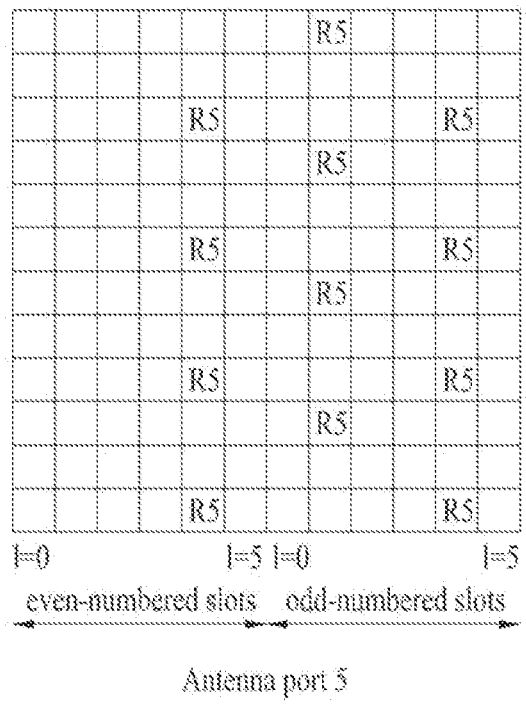
FIG. 7 illustrates a user specific downlink reference signal structure, with respect to a subframe using an extended Cyclic Prefix (extended CP), wherein 1TTI has 12 OFDM symbols.
Figure 8:
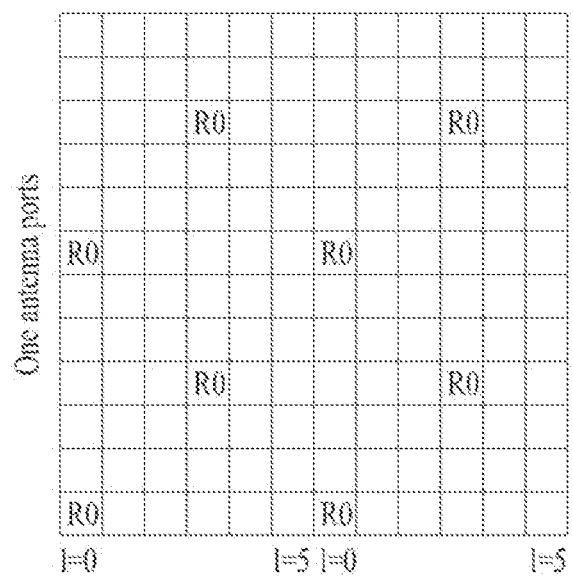
Figure 9:
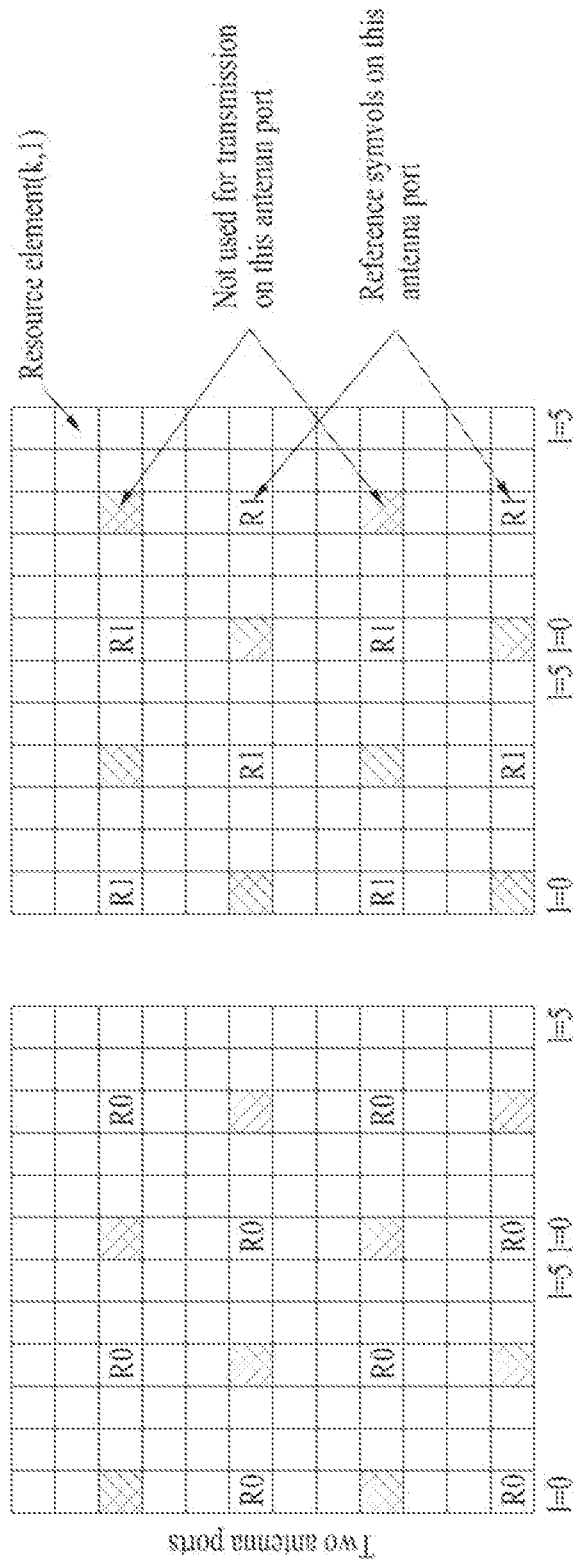
Figure 11:
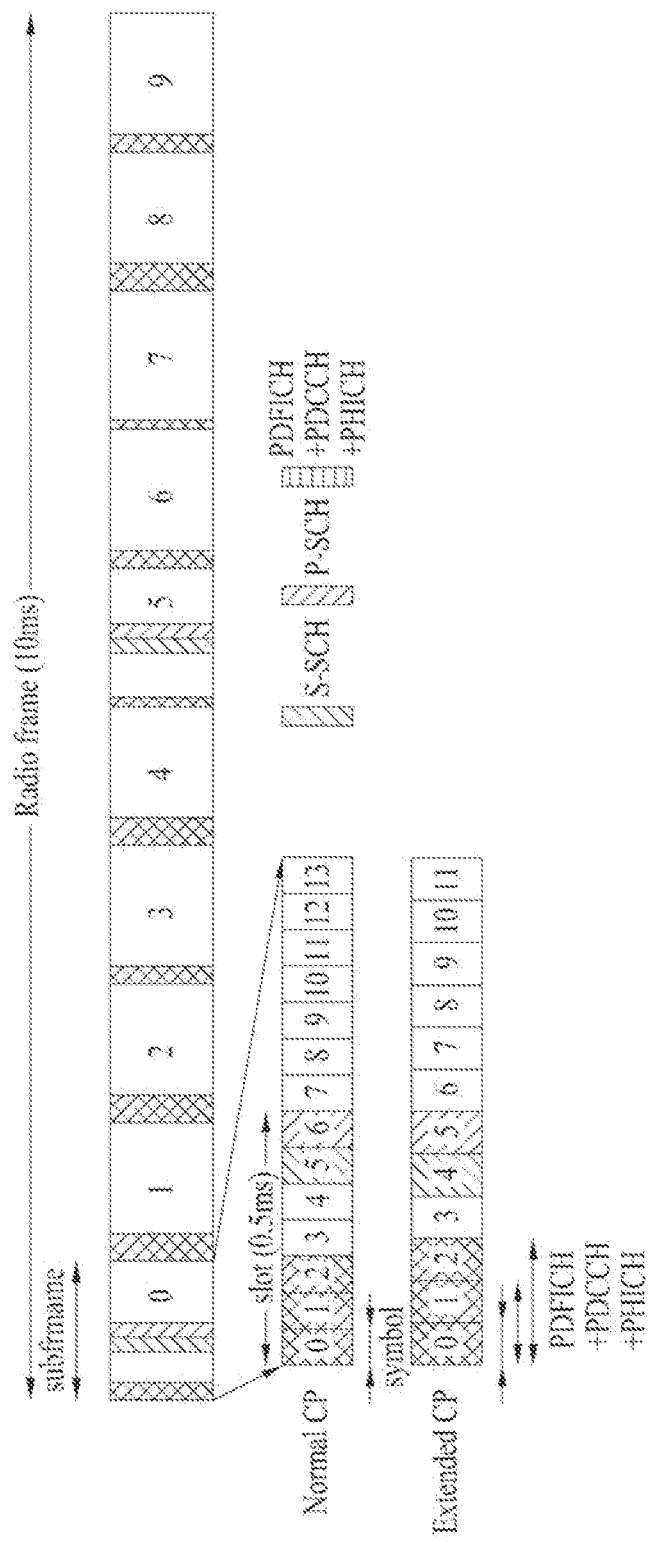
FIG. 11 illustrates a downlink frame structure in an OFDM-based FDD (Frequency Division Duplex) system, as a frame structure of a 3GPP LTE system, and a position of a basic control channel.

In order to configure an LTE-A system that supports both LTE UEs and LTE-A UEs at the same time, it is preferable that the basic (or essential) frame structure of is configured identically as that of the LTE system. FIG. 11 illustrates a downlink frame structure in an OFDM-based FDD (Frequency Division Duplex) system, as a frame structure of a 3GPP LTE system, and a position of a basic control channel. As shown in FIG. 11, a radio frame is configured of 10 ms and has 10 subframes. Accordingly, one subframe has the length of 1 ms, and each frame is configured of 2 slots of 0.5 ms. Depending upon a normal Cyclic Prefix (normal CP) or an extended Cyclic Prefix (extended CP), each slot is configured of 7 or 6 OFDM symbols.

As shown in FIG. 11, in order to perform synchronization, two synchronization channels, an S-SCH (Secondary-Synchronization Channel) and a P-SCH (Primary-Synchronization Channel), are used, and the two synchronization channels are transmitted for each radio frame. Additionally, in order to transmit resource allocation information respective to each subframe for each subframe, a PDCCH (Physical Downlink Control Channel) is transmitted between OFDM symbol #0 to OFDM symbol #2. Also, depending upon the amount of control channels, control channel information may be sent to OFDM symbol #0, OFDM symbols #0 and #1, and OFDM symbols #0 to #2. The number of OFDM symbols used by a control channel may be varied for each subframe, and, in this case, the respective information is notified to a PDFICH (Physical Control Format Indicator Channel). The 10 subframes included in a single radio frame shown in FIG. 11 may each be defined differently in accordance with the respective purpose and may each be used accordingly.

For example, depending upon the circumstances, each subframe may be defined and used as an LTE only subframe or an Rel-8 subframe, a mixed subframe or an LTE-A only subframe, and so on. The LTE only subframe refers to a subframe supporting LTE UEs only, the mixed subframe refers to a subframe supporting both LTE UEs and LTE-A UEs, and the LTE-A only subframe refers to a subframe supporting LTE-A UEs only.

Since each subframe is designed to fit a specific UE group, degradation in UE performance of another UE group may occur. Based upon the definition of each subframe, diverse forms of Reference Signal (RS) structures may be used. The available RS formats may be briefly defined as shown below.

First of all, depending upon the purpose of the RS, the RS may be categorized as an RS for demodulation (or demodulation RS) and an RS for measurement (or measurement RS).

The RS for demodulation is essentially used for receiving data in a MIMO system, and, in this case, it is preferable that the RS is always transmitted with the respective data. And, it is imperative to design the RS so that the RS can have high quality channel estimation performance.

The RS for measurement may be used in a feedback of channel information for link adaptation. The RS for measurement may be used for calculating a CQI (Channel Quality Indicator), a PMI (Precoding Matrix Index), RI (Rank Information), and so on. And, in this case, no problem occurs even when the RS for measurement is transmitted in accordance with a cycle period of the channel information feedback, and the RS for measurement may perform without any problem, even though the RS for measurement has a lower channel estimation performance than the RS for demodulation.

Furthermore, depending upon the RS type, the RS may be categorized as a Common RS (CRS), a dedicated RS (DRS), and a combined RS, wherein the CRS and the DRS are combined.

As an RS format that is used in the LTE system, the CRS may be used for the purpose of both demodulation and measurement.

Figure 12:
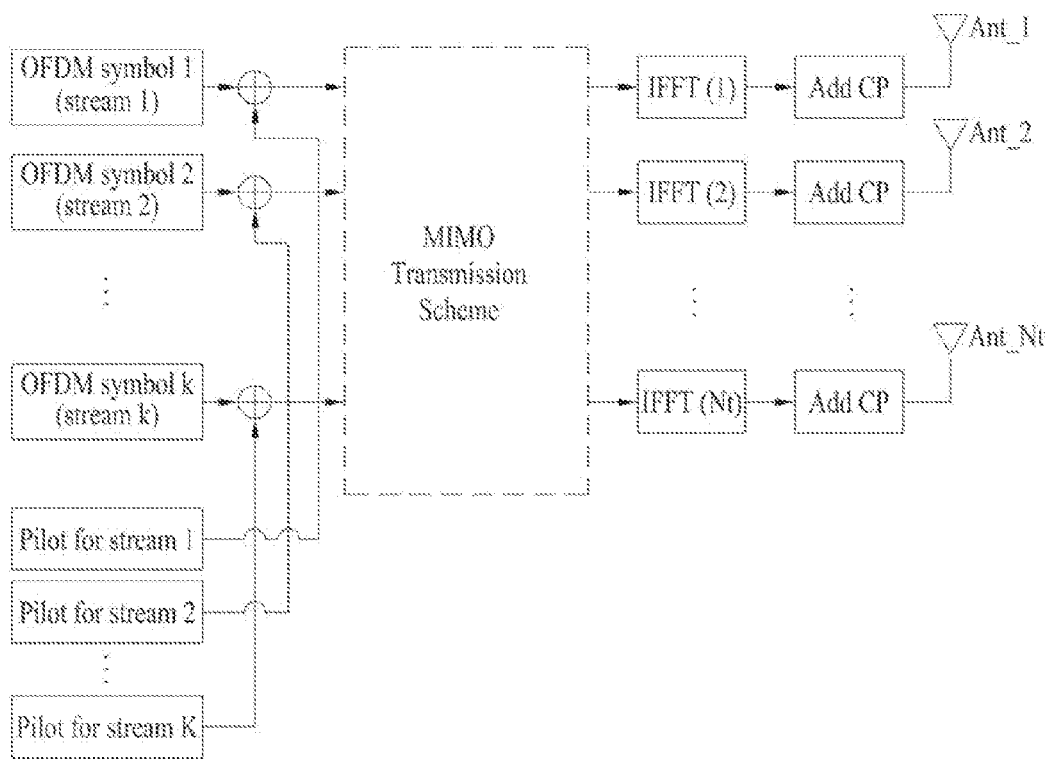
FIG. 12 illustrates an exemplary method for transmitting a CRS, in the LTE system.

FIG. 12 illustrates an exemplary method for transmitting a CRS, in the LTE system. As shown in FIG. 12, regardless of the MIMO transmission method, the RS is always transmitted as much as the number of physical or virtual antennas. Referring to FIG. 12, Nt indicates a number of physical or virtual antennas, and K represents a spatial multiplexing rate. Referring to FIG. 12, Nt number of RSs is always transmitted regardless of the value K.

The DRS is mostly used for demodulation, and the DRS may be categorized by two formats. One is a 'precoded RS', and the other is a 'non-precoded RS'. By using a method of configuring an RS in accordance with a specific UE or UE group and transmitting the configured RS, the DRS is configured so that RS cannot be received in a frequency domain other that the frequency domain allocated to the UE. In case the system is configured of 'non-precoded RS', the RS is transmitted in the format shown in FIG. 12.

Figure 13:
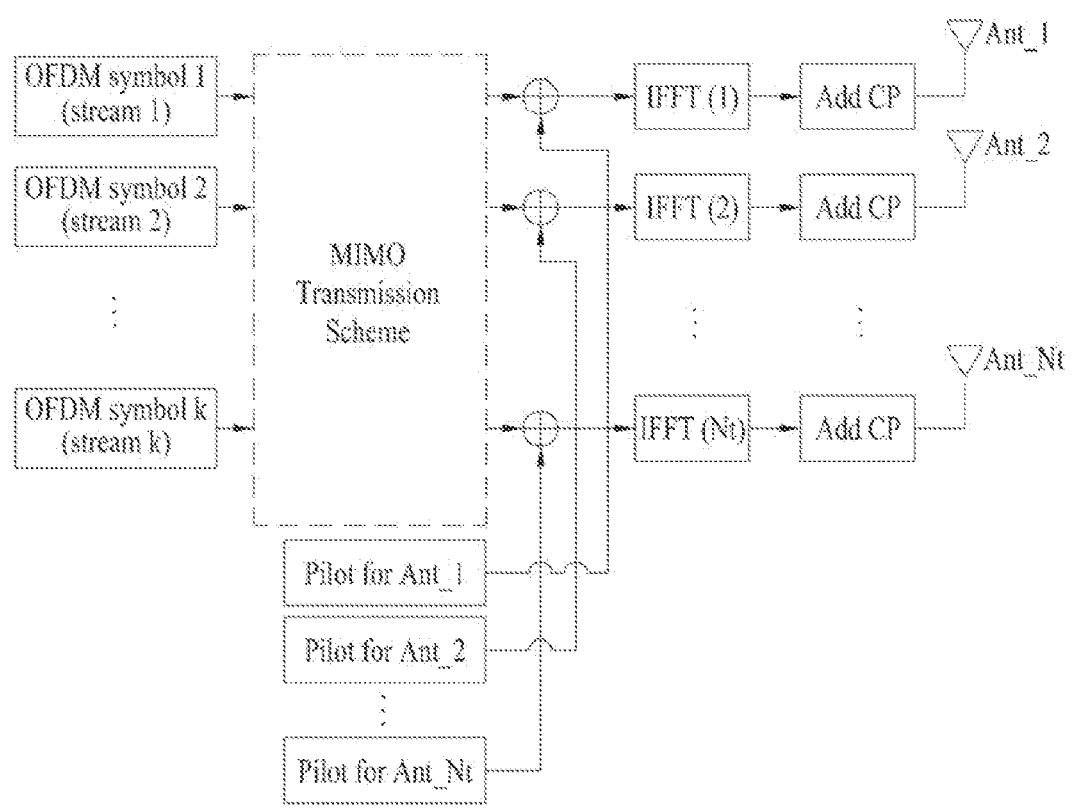
FIG. 13 illustrates a method for transmitting a DRS, when the DRS is configured of precoded RS, in the LTE system.

FIG. 13 illustrates a method for transmitting a DRS, when the DRS is configured of precoded RS, in the LTE system. In case the system is configured of 'precoded RS', the RS is transmitted in the format shown in FIG. 13. As shown in FIG. 13, the number of transmitted RSs is equal to the spatial multiplexing rate or the number of layers, and, in case the spatial multiplexing rate or the number of layers is low (or small), the overhead of the RS may be largely reduced.

Furthermore, as the above-described combined format of the CRS and the DRS, the RS may be configured such that specific physical or virtual antennas use the CRS and the remaining physical or virtual antennas use the DRS.

Hereinafter, a method of configuring the RS based upon the subframe type according to the present invention will now be described in detail by using the above-described RS.

(1) LTE Only Subframe

The LTE only subframe corresponds to a subframe optimized for LTE UEs, and the LTE only subframe is configured identically as the subframe of the LTE system. Therefore, it is preferable to use only the CRS. In case of using the CRS, since the LTE system supports up to a 4Tx MIMO scheme, the RS may also support up to 4Tx, the RS structure may be identical to the RS structure of the LTE system. Since the LTE-A system is basically configured of 8 transmission antennas, the LTE-A system uses antenna virtualization in order to realize 4Tx without any loss in the transmission power. Equation 1 shown below corresponds to an equation describing a basic antenna virtualization method.

$$R_i(m) = \bar{v}_i \cdot r_i(m), i = 0, 1, \ldots, 7 \quad \text{Equation 1}$$

$$V = (\bar{v}_0, \bar{v}_2, \ldots, \bar{v}_7) = \underbrace{\begin{pmatrix} v_{00} & v_{10} & \cdots & v_{70} \\ v_{01} & v_{11} & \cdots & v_{70} \\ \vdots & \vdots & \ddots & \vdots \\ v_{07} & v_{17} & \cdots & v_{77} \end{pmatrix}}_{\text{virtualization matrix}}$$

This method corresponds to a method of configuring 8 virtual antennas, as shown in Equation 1, and transmitting RSs for 4 virtual antennas among the total of 8 virtual antennas, when performing a 4Tx MIMO transmission. $r_i(m)$, $i=0, 1, \ldots, 7$ represents an RS sequence for antenna ports 0 to 7 and may be mapped to the virtual antennas by using a virtual antenna matrix (V). Herein, $R_i(m)$, $i=0, 1, \ldots, 7$ represents an RS sequence having virtual antennas mapped thereto.

Herein, $\bar{v}_i$ nts an $i$-$^{th}$ column of the virtual antenna matrix, and $v_{ij}$ represents a complex coefficient. Depending upon the respective circumstances, $\bar{v}_i$ and $v_{ij}$ may be configured of diverse formats, and it is preferable to generally configure the V matrix in a unitary matrix format, so that all transmission antennas can equally transmit the same amount of power.

(2) Mixed Subframe

The mixed subframe corresponds to a subframe configured to simultaneously support LTE UEs and LTE-A UEs in a single subframe. The subframe may be basically configured to always transmit the CRSs for physical or virtual antenna ports 0 to 3, and the RSs for physical or virtual antenna ports 4 to 7, which shall be transmitted in order to support the LTE-A, may be realized by using the method described below.

First of all, the subframe may be configured so as that the CRSs can be transmitted for antenna ports 4 to 7. More specifically, the subframe may be configured so as that the CRSs can be transmitted for physical or virtual antenna ports 4 to 7. In this case, due to the CRSs of physical or virtual antenna ports 4 to 7 for the LTE-A UE in the allocated resource, the performance of the LTE UE may be slightly degraded. Therefore, it is preferable that the CRSs of physical or virtual antenna ports 4 to 7 for the LTE-A UE is used for measurement purposes only, and, in order to minimize the influence to the LTE UE, it is preferable to transmit the RS by using a limited amount of power and to minimize density.

Accordingly, as a power control method for the measurement of the CRSs of physical or virtual antenna ports 4 to 7, the present invention proposes the following methods.

A first method corresponds to a maximum boosting limitation method, wherein, when it is given that a maximum available power boosting level for the CRSs of physical or virtual antenna ports 0 to 3 is X dB, the CRSs of physical or virtual antenna ports 4 to 7 may be configured to be available for up to Y dB, and, at this point, the given values of X and Y may satisfy the condition of X>Y.

A second method corresponds to a fixed power transmission method, wherein, the CRSs of physical or virtual antenna ports 0 to 3 may be configured to use power by controlling the RS power boosting level within a predetermined range, and wherein the CRSs of physical or virtual antenna ports 4 to 7 may be configured to be transmitted always by a specific power level.

A third method corresponds to a delta power boosting level, wherein the power level of the CRSs of physical or virtual antenna ports 0 to 3 and the power level of the CRSs of physical or virtual antenna ports 4 to 7 may be configured to always have a power level difference of delta dB. Herein, the delta dB value may be configured to be semi-static, and, herein, information on the power level may be notified to the UE through a specific control signal.

Meanwhile, there is a method of transmitting a number of DRSs corresponding to the spatial multiplexing rate or the number of layers. In addition to the CRSs of physical or virtual antenna ports 0 to 3, which is transmitted for the LTE UE, the DRS may be transmitted for the LTE-A UE. The corresponding DRS is transmitted only in a resource area to which the LTE-A UE is allocated, and in case the DRS is transmitted in a 'precoded RS' format, only a number of RSs corresponding to the spatial multiplexing rate or the number of layers is transmitted. Such RS may be used for demodulation purposes, and, therefore, the CRSs of physical or virtual antenna ports 4 to 7 should be additionally transmitted.

With respect to the spatial multiplexing rate, in case a total of 8 DRSs is transmitted in order to support spatial multiplexing rate 8, the overhead may be excessively large. Therefore, in this case, in order to resolve this problem, configurations may be made so that the base station can determine and control a maximum spatial multiplexing rate available to each UE, depending upon the circumstances. For example, when the base station determines and assigns a maximum available rank to the UE, the UE may be configured to transmit feedback below the determined rank.

Meanwhile, the RS structure may be configured differently based upon the MIMO transmission mode. For example, in an open-loop transmission mode, since a change in the channel with respect to time is large, the RS structure may be configured to have a format that allows channel estimation to be performed easily along the time axis. And, in a closed-loop transmission mode, the change in the channel with respect to time is small, but the channel estimation performance level should be high. Therefore, the RS structure may be configured to have a format that allows channel estimation to be performed easily along the frequency axis. For example, multiple RS patterns are configured with respect to the same rank in accordance with the RS overhead or in accordance with the channel status and an RS pattern most appropriate to the environment of the UE is selected, whereby an RS optimized for each UE may be configured.

Meanwhile, in case the spatial multiplexing rate of the LTE UE is less than 4, the CRSs of physical or virtual antenna ports 0 to 3 are used, and, in case the spatial multiplexing rate of the LTE UE is greater than 4, a number of DRSs corresponding to the increased number is used.

(3) LTE-A Only Subframe

The LTE-A only subframe, which is configured to support LTE-A UEs only, may be configured by using an MBSFN (Multicast/Broadcast over a Single Frequency Network) subframe of the LTE system. Since the LTE-A only subframe does influence the LTE UE, an RS of a new format may be easily designed. Therefore, in this case, all of the above-described RS formats may be configured.

The method of configuring the RS based upon the subframe type has been described. Hereinafter, a method of configuring the RS based upon the MIMO scheme will now be described in detail based on the subframe types.

(1) LTE Only Subframe

The LTE-A UE may be designed so as to be capable of using the same LTE MIMO scheme as the LTE UE in the corresponding subframe. Alternatively, in case the LTE-A UE is allocated to an LTE only subframe, only an open loop MIMO scheme (e.g., Transmit Diversity scheme (TxD), Open-loop Spatial Multiplexing (OL-SM)) may be used.

(2) Mixed Subframe

With respect to the CRSs of physical or virtual antenna ports 4 to 7, when the TxD scheme or the OL-SM is used, the RS is configured so that the corresponding LTE-A UE can receive only the CRSs of physical or virtual antenna ports 0 to 3 and not the CRSs of physical or virtual antenna ports 4 to 7. At this point, when only the CRSs for antenna ports 0 to 1 are used for the LTE UE, the LTE UE is also configured to receive only the corresponding CRSs. In this case, during the transmission using the TxD or OL-SM, the LTE-A UE receives PDSCH data having the same format as that of the LTE UE. More specifically, a MIMO scheme identical to that of the LTE UE may be used. Herein, although the two schemes are configured to have the same format, in some cases, only one of the two schemes may be realized by using the above-described method.

Meanwhile, with respect to the DRSs for layers 0 to 7, the following two schemes are proposed.

When the TxD scheme or the OL-SM is used, a first scheme is configured so that the DRSs cannot be transmitted to the corresponding LTE-A UE and also so that data can be received by using the CRSs of physical or virtual antenna ports 0 to 3. At this point, also, when the CRSs for the LTE UE are used only by antenna ports 0 to 1, the LTE-A UE is configured to receive data by using only the corresponding CRS. In this case, during the transmission using the TxD or OL-SM, the LTE-A UE receives PDSCH data having the same format as that of the LTE UE. More specifically, a MIMO scheme identical to that of the LTE UE is used.

When the TxD scheme or the OL-SM is used, a second scheme transmits 4 layer DRSs or 2 layer DRSs to the corresponding LTE-A UE. Herein, when transmitting the 4 layer DRSs, a 4Tx MIMO scheme of the LTE system is applied, and, when transmitting the 2 layer DRSs, a 2Tx MIMO scheme of the LTE system is applied. The two schemes may be or used in combination, and the two schemes may be configured to be differently applied for each LTE-A UE.

When the 4 layer DRSs and the 2 layer DRSs are used in combination, configurations may be made so that the DRSs are used by being dynamically switched in subframe units or radio frame units. Or, one of the 2 layer DRSs and the 4 layer DRSs may be semi statically determined and configured for each LTE-A UE.

Meanwhile, with respect to the DRSs for layers 4 to 7, when the TxD and the OL-SM are used, the DRSs are not received, and data is received by using the CRSs of physical or virtual antenna ports 0 to 3 for the LTE UE, and, in this case, PDSCH data having the same format as that of the LTE UE are received. At this point, a maximum spatial multiplexing rate of the OL-SM may be limited to 4 (or the rank may be limited to 4, or the number of layers may be limited to 4).

(3) LTE-A Only Subframe

In case the DRS is used for demodulation, the DRS may be transmitted in a 4Tx virtual antenna format, which is transmitted to the PDCCH (Physical Downlink Control Channel). More specifically, 4 layer DRSs are transmitted. However, in this case, the 4 layer DRSs may be transmitted in the CRS format of physical or virtual antenna ports 0 to 3. When transmission is performed as described above, interpolation may be performed with a previous subframe, thereby enhancing the channel estimation performance. In some cases, only 2 layer DRSs may be transmitted. When transmitting only the 2 layer DRSs, the RS overhead maybe additionally reduced. When the 4 layer DRSs and the 2 layer DRSs are used in combination, the subframe may be configured so that switching can be either dynamically performed in subframe units or radio frame units or semi statically performed for each LTE-A UE.

Hereinafter, the configuration of the LTE-A MIMO scheme with respect to the CRS and the DRS according to an embodiment of the present invention will now be described in detail.

With respect to the LTE-A UE, the LTE-A MIMO scheme is configured so that the CRS can be used only for measurement purposes and so that the DRS can be used for demodulation purposes. The LTE-A MIMO transmission scheme may be configured as described below.

With respect to Closed Loop Precoding (CL-Precoding), demodulation is always performed through the DRS, and only a number of DRSs corresponding to the spatial multiplexing rate is transmitted. Therefore, when the spatial multiplexing rate is low, the RS overhead may be reduced.

With respect to TxD and OL-SM, in the LTE-A only subframe, the DRS is transmitted with 4 layers or 2 layers, and the transmission scheme may reuse the 2Tx or 4Tx MIMO scheme of the LTE system, and, in the remaining subframes, the CRSs of physical or virtual antenna ports 0 to 3 that are transmitted for the LTE UE may be used to receive data. And, in this case, the LTE MIMO transmission scheme respective to the corresponding number of CRSs is applied as the MIMO scheme.

With respect to the CRS for measurement, among the 8 virtual antennas, 4 virtual antennas are selected so as to transmit the CRSs of virtual antennas 0 to 3, and, based upon time, the CRSs of virtual antennas 4 to 7 may be transmitted at the positions on which the CRSs of virtual antennas 0 to 3 have been transmitted.

Figure 14:
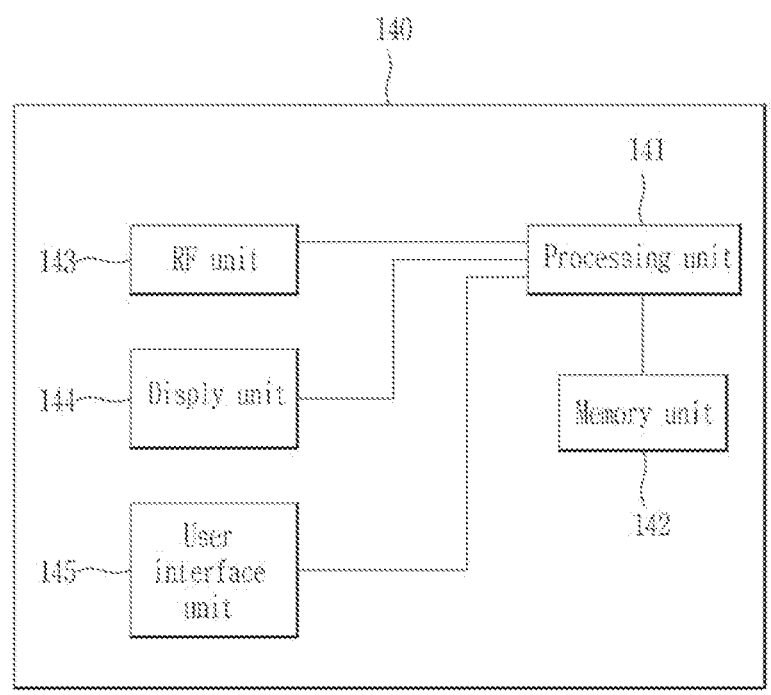
FIG. 14 illustrates a block view showing the structure of a device that can be applied to a base station and a user equipment and that can perform the above-described method.

FIG. 14 illustrates a block view showing the structure of a device that can be applied to a base station and a user equipment and that can perform the above-described method. As shown in FIG. 14, a device (140) includes a processing unit (141), a memory unit (142), an RF (Radio Frequency) unit (143), a display unit (144), and a user interface unit (145). A layer of a physical interface protocol is performed in the processing unit (141). And, the processing unit (141) provides a control plane and a user plane. The function of each layer is performed by the processing unit (141). The memory unit (142) is electrically connected to the processing unit (141) and stores an operating system, applications, and general files. If the device (140) corresponds to a user device, the display unit (144) may display diverse information. And, the display unit (144) may be realized by using as LCD (Liquid Crystal Display), OLED (Organic Light Emitting Diode) as disclosed herein. The user interface unit (145) may be configured by being combined with any one of the disclosed user interfaces, such as a keypad, a touchscreen, and so on. RF unit (143) is electrically connected to the processing unit (141) and either transmits or receives radio signals.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the present invention, the term User Equipment (UE) may be replaced with the terms MS (Mobile Station), SS (Subscriber Station), MSS (Mobile Subscriber Station), or Mobile Terminal, and so on.

Meanwhile, PDAs (Personal Digital Assistants), cellular phones, PCS (Personal Communication Service) phones, GSM (Global System for Mobile) phones, WCDMA (Wideband CDMA) phones, MBS (Mobile Broadband System) phones may be used as the UE of the present invention.

MODE FOR CARRYING OUT THE PRESENT INVENTION

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

It will be apparent to those skilled in the art that various modifications and variations can be made in the present invention without departing from the technical and essential spirit or scope of the invention. Therefore, the detailed description of the present invention should not be interpreted as limiting in all aspects of the present invention, but should be considered as exemplary. The scope of the appended claims of the present invention shall be decided based upon rational interpretation, and all modifications within the scope of the appended claims and their equivalents will be included in the scope of the present invention. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be used in a mobile station, base station, or other equipments of a wireless mobile communication system.

What is claimed is:

1. A method for transmitting a reference signal (RS) by a Base Station (BS) that supports a Long-Term Evolution (LTE) system supporting N number of transmitting antennas among a total of M number of transmitting antennas and an LTE Advanced (LTE-A) system supporting M number of transmitting antennas where M is greater than N, the method comprising:
    creating, by the BS, a subframe supporting both the LTE system and the LTE-A system; and
    transmitting the subframe to a User Equipment (UE),
    wherein, in the subframe, Common Reference Signals (CRSs) for antenna ports 0 to N−1 are mapped, and CRSs for antenna ports N to M−1 are mapped,
    wherein a power level of the CRSs for antenna ports 0 to N−1 and a power level of the CRSs for antenna ports N to M−1 are independently controlled, and
    wherein the power level of the CRSs for antenna ports 0 to N−1 is greater than the power level of the CRSs for antenna ports N to M−1.

2. The method of claim 1, wherein:
    the power level of the CRSs for antenna ports 0 to N−1 is controlled within a predetermined range, and
    the power level of the CRSs for antenna ports N to M−1 is determined as a fixed power level.

3. The method of claim 1, wherein the power level of the CRSs for antenna ports 0 to N−1 and the power level of the CRSs for antenna ports N to M−1 have a difference of a predetermined value.

4. The method of claim 1, wherein N is equal to 4 and M is equal to 8.

5. The method of claim 1, wherein:
    if a spatial multiplexing rate of the UE is greater than N, Dedicated Reference Signal(s) (DRS(s)) for a number of antennas corresponding to a difference value between the spatial multiplexing rate and the value N are mapped, and
    the DRS is mapped based on a pattern selected from multiple DRS patterns, which are created in advance for each spatial multiplexing rate of the UE.

6. The method of claim 5, wherein the multiple DRS patterns are created in accordance with a transmission mode for each spatial multiplexing rate of the UE.

7. The method of claim 5, wherein the multiple DRS patterns are created in accordance with an RS overhead for each spatial multiplexing rate of the UE.

8. A method for receiving a reference signal (RS) from a Base Station (BS) that supports a Long Term Evolution (LTE) system supporting N number of transmitting antennas among a total of M number of transmitting antennas and an LTE Advanced (LTE-A) system supporting M number of transmitting antennas where M is greater than N, the method comprising:
    receiving, by a User Equipment (UE), a subframe supporting both the LTE system and the LTE-A system from the BS,
    wherein, in the subframe, Common Reference Signals (CRSs) for antenna ports 0 to N−1 are mapped, and CRSs for antenna ports N to M−1 are mapped, and
    wherein a power level of the Common Reference Signals (CRSs) for antenna ports 0 to N−1 and a power level of the CRSs for antenna ports N to M−1 are independently controlled, and
    wherein the power level of the CRSs for antenna ports 0 to N−1 is greater than the power level of the CRSs for antenna ports N to M−1.

9. The method of claim 8, wherein:
    the power level of the CRSs for antenna ports 0 to N−1 is controlled within a predetermined range, and
    the power level of the CRSs for antenna ports N to M−1 is determined as a fixed power level.

10. The method of claim 8, wherein the power level of the CRSs for antenna ports 0 to N−1 and the power level of the CRSs for antenna ports N to M−1 have a difference of a predetermined value.

11. The method of claim 8, wherein N is equal to 4 and M is equal to 8.

12. The method of claim 8, further comprising: demodulating data by using a data symbol and the DRS(s) included in the received subframe.

13. The method of claim 8, wherein:
    if a spatial multiplexing rate of the UE is greater than N, Dedicated Reference Signal(s) (DRS(s)) for a number of antennas corresponding to a difference value between the spatial multiplexing rate and the value N is mapped, and
    the DRS(s) is mapped in the subframe based on a pattern selected from multiple DRS patterns, which are created in advance for each spatial multiplexing rate of the UE.

14. The method of claim 13, wherein the multiple DRS patterns are created in accordance with a transmission mode for each spatial multiplexing rate of the UE.

15. The method of claim 13, wherein the multiple DRS patterns are created in accordance with an RS overhead for each spatial multiplexing rate of the UE.

* * * * *